United States Patent
Sugaya et al.

(10) Patent No.: US 6,542,494 B1
(45) Date of Patent: Apr. 1, 2003

(54) COMMUNICATION CONTROL METHOD AND TRANSMISSION APPARATUS

(75) Inventors: Shigeru Sugaya, Kanagawa (JP); Hidemasa Yoshida, Chiba (JP); Takanobu Kamo, Kanagawa (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/392,739

(22) Filed: Sep. 9, 1999

(30) Foreign Application Priority Data

Sep. 11, 1998 (JP) .......................................... 10-258855

(51) Int. Cl.⁷ ................................................. H04J 3/00
(52) U.S. Cl. ...................... 370/345; 370/255; 370/254; 455/11.1; 375/360
(58) Field of Search ................................. 370/254, 255, 370/328, 329, 336, 338, 335, 245; 455/11.1, 7, 17; 375/360

(56) References Cited

U.S. PATENT DOCUMENTS

| | | | | |
|---|---|---|---|---|
| 5,128,934 A | * | 7/1992 | Jasinski ..................... | 340/7.26 |
| 5,355,511 A | * | 10/1994 | Hatano et al. ............... | 340/991 |
| 5,475,681 A | * | 12/1995 | White et al. ................. | 370/346 |
| 5,857,144 A | * | 1/1999 | Mangum et al. ........... | 455/11.1 |
| 6,088,326 A | * | 7/2000 | Lysejko et al. ............. | 370/209 |
| 6,141,533 A | * | 10/2000 | Wilson et al. .............. | 455/11.1 |
| 6,175,550 B1 | * | 1/2001 | van Nee ..................... | 370/206 |
| 6,192,026 B1 | * | 2/2001 | Pollack et al. .............. | 370/203 |
| 6,307,843 B1 | * | 10/2001 | Okanoue .................... | 370/312 |
| 6,359,877 B1 | * | 3/2002 | Rathonyi et al. ........... | 370/232 |

\* cited by examiner

Primary Examiner—Edward F. Urban
Assistant Examiner—Khawar Iqbal
(74) Attorney, Agent, or Firm—Jay H. Maioli

(57) ABSTRACT

A frame period is specified by means of a predetermined signal; a management data transmission region is set in this frame period; and when common information to be transmitted from the control station in the management data transmission region is received at a plurality of communication stations, any of these communication stations performs processing for repeatedly transmitting the received common information, whereby when communications in a network system are controlled by a control station, a station incapable of directly making communication with a control station can be controlled satisfactorily.

9 Claims, 13 Drawing Sheets

Management Information Retransmission (Branch Station)

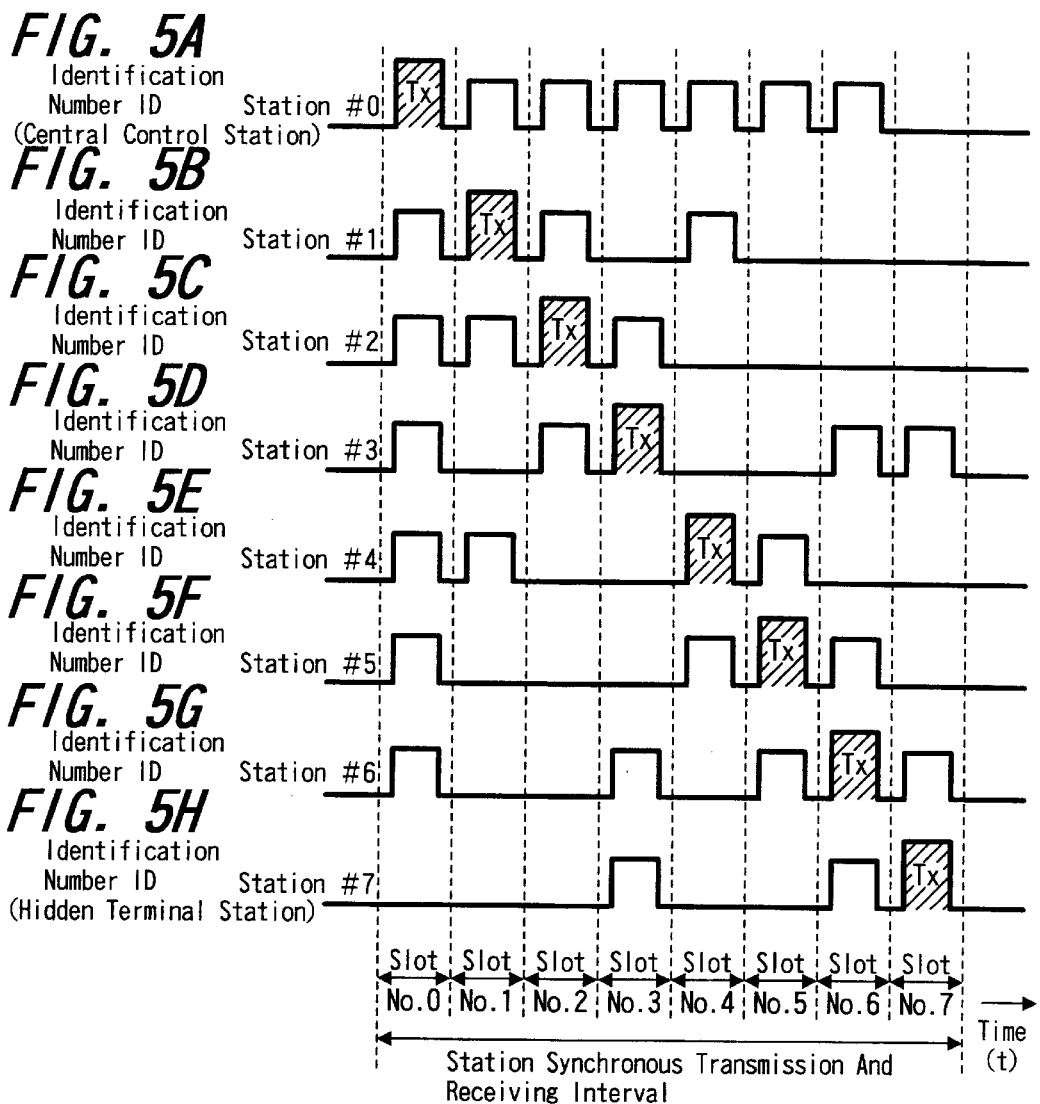

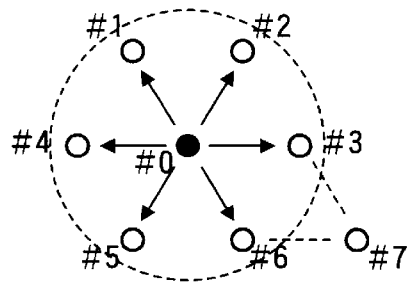
FIG. 6A Station Synchronous Transmission (#0)
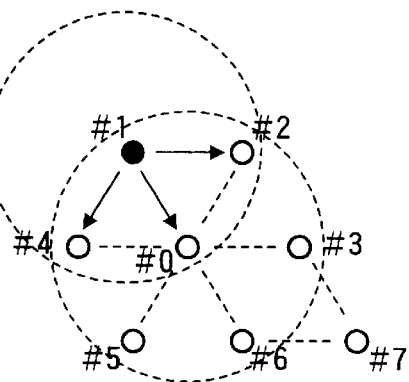
FIG. 6B Station Synchronous Transmission (#1)
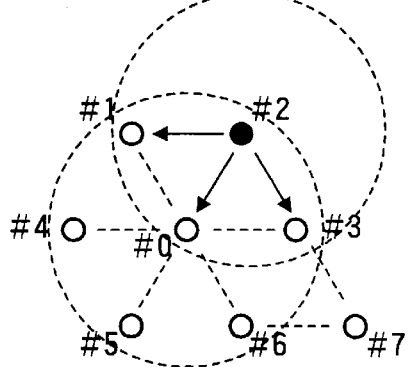
FIG. 6C Station Synchronous Transmission (#2)
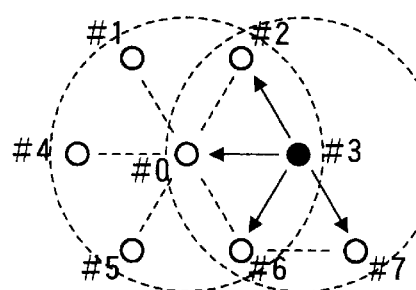
FIG. 6D Station Synchronous Transmission (#3)
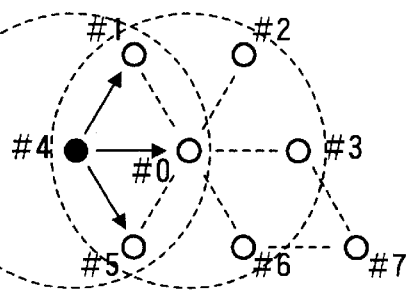
FIG. 6E Station Synchronous Transmission (#4)
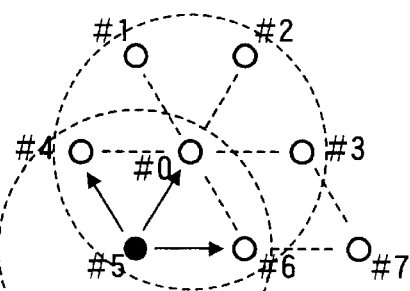
FIG. 6F Station Synchronous Transmission (#5)
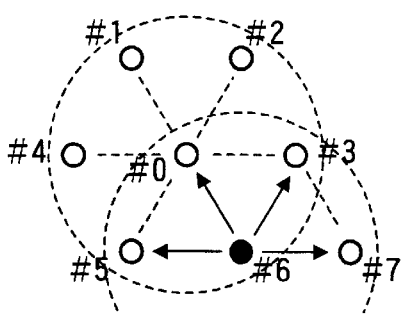
FIG. 6G Station Synchronous Transmission (#6)
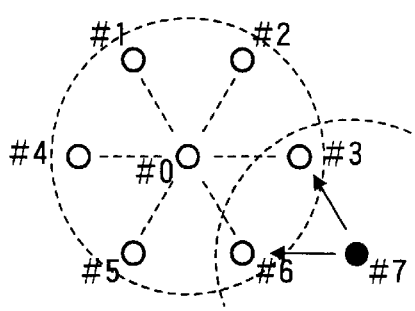
FIG. 6H Station Synchronous Transmission (#7)

FIG. 9A Management Information Transmission (Control Station)

FIG. 9B Management Information Retransmission

FIG. 11A ID Station #0 (Central Control Station)
FIG. 11B ID Station #1
FIG. 11C ID Station #2
FIG. 11D ID Station #3
FIG. 11E ID Station #4
FIG. 11F ID Station #5
FIG. 11G ID Station #6
FIG. 11H ID Station #7 (Hidden Terminal Station)
Control Station Notification | Relay Notification
Management Information Broadcasting Interval

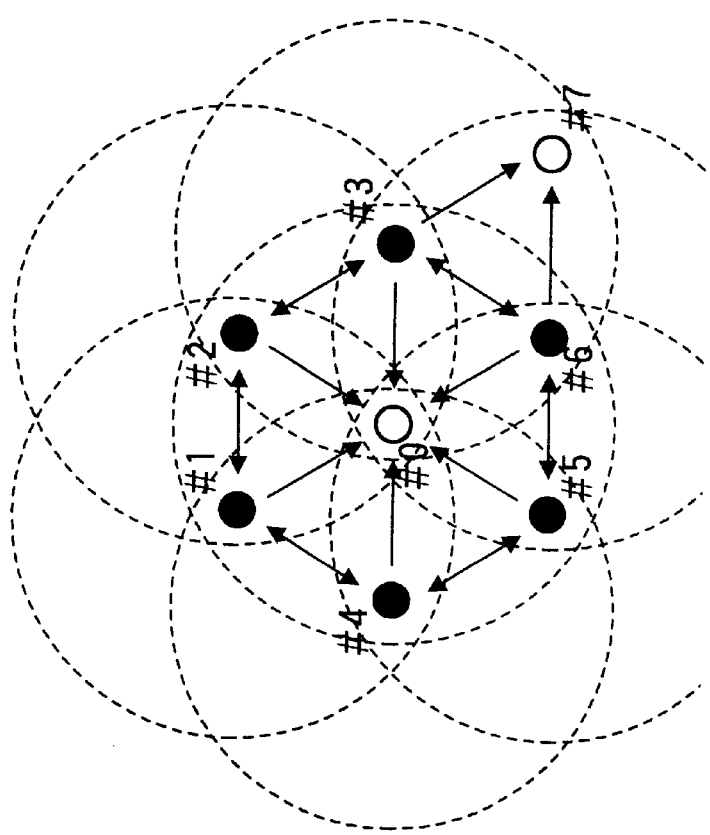
FIG. 12B Management Information Retransmission (Branch Station)
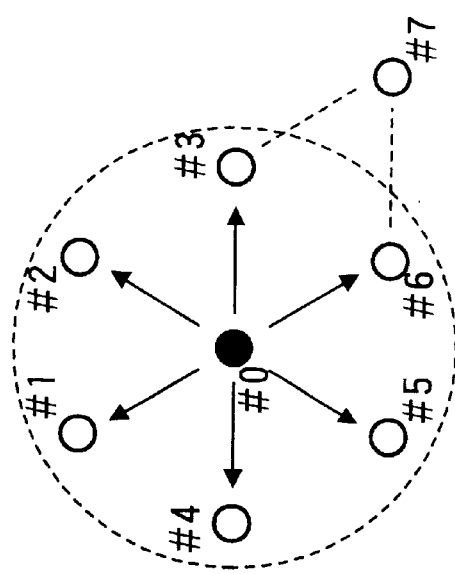
FIG. 12A Management Information Transmission (Control Station)

FIG. 14A  ID  Station #0
(Central Control Station)
FIG. 14B  ID  Station #1
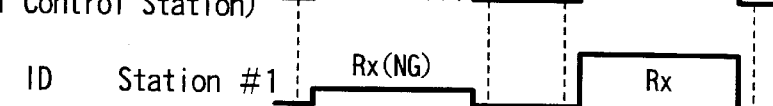
FIG. 14C  ID  Station #2
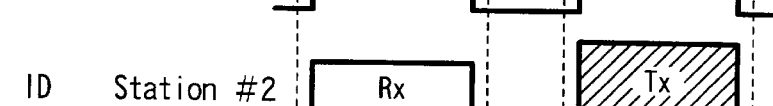
FIG. 14D  ID  Station #3
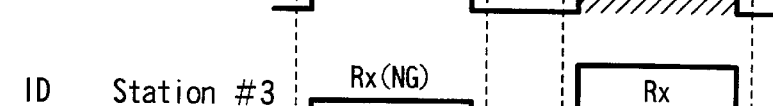
FIG. 14E  ID  Station #4
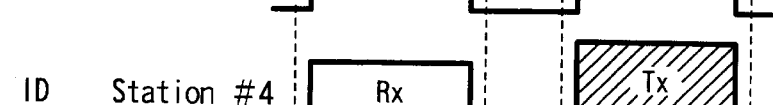
FIG. 14F  ID  Station #5
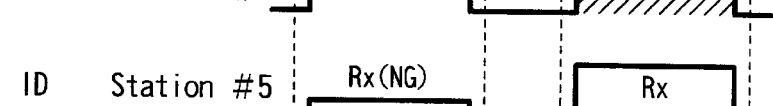
FIG. 14G  ID  Station #6
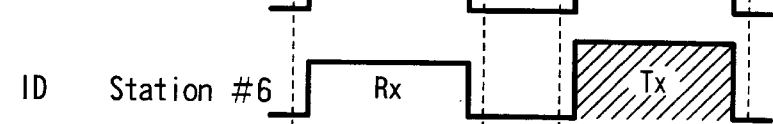
FIG. 14H  ID  Station #7
(Hidden Terminal Station)
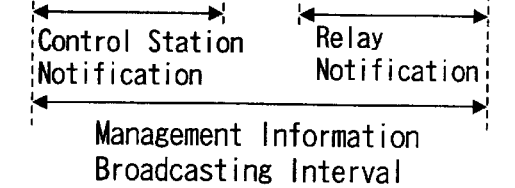

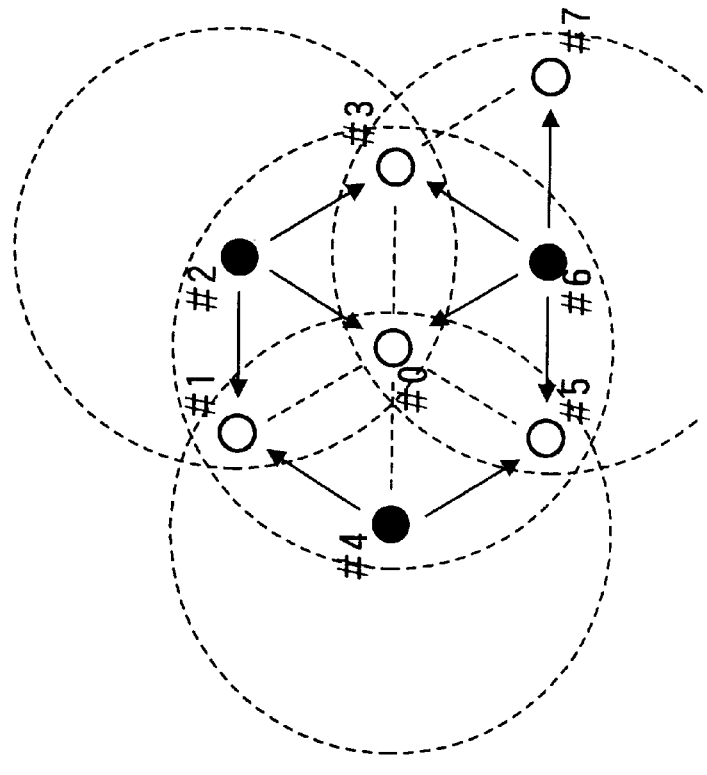
FIG. 15B Management Information Retransmission (Branch Station)
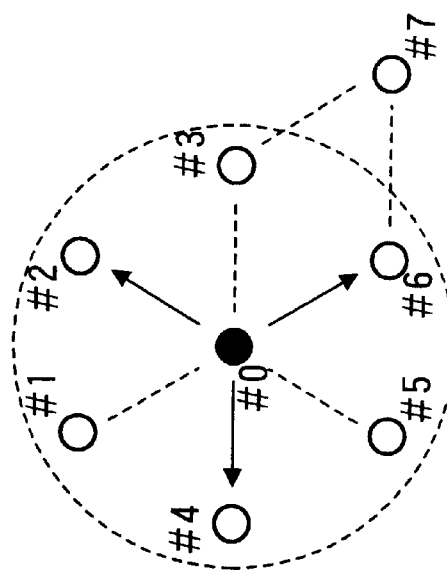
FIG. 15A Management Information Transmission (Control Station)

COMMUNICATION CONTROL METHOD AND TRANSMISSION APPARATUS

BACKGROUND OF THE INVENTION

1. Field of the Invention

The present invention relates to a communication control method preferably applied to a case where various information is transmitted by means of a wireless signal, for example, to construct a local area network (LAN) among a plurality of devices, and a transmission apparatus using this control method.

2. Description of the Related Art

Conventionally, in a relatively small range such as home, office or the like, when a local area network is constructed among a plurality of apparatus such as various video apparatus, a personal computer machine, its periphery apparatus or the like so as to transmit data handled by these apparatus, a wireless signal transmitter/receiver (a wireless transmission apparatus) is connected to each apparatus so as to enable data transmission through wireless transmission, instead of direct connection among apparatuses via a signal line.

A local area network is constructed through wireless transmission, thereby making it possible to simplify a system configuration without requiring direct connection among apparatus via a signal line or the like.

In the meantime, in the case where a local area network is constructed by using a plurality of wireless transmission apparatuses, if signals are transmitted simultaneously from a plurality of transmission apparatuses using a same transmission bandwidth, a transmission error may occur. Thus, communication among the respective transmission apparatuses in the network is required to access-control by means of any method.

As a conventionally known access control method, for example, in a small scale wireless network, there is exemplified a method for integrally managing communication among transmission apparatuses (nodes) in the network by means of a transmission apparatus (a route node) serving as a central part using a start-type connection.

However, to perform transmission processing using such star-type connection, it is presumed that a transmission apparatus serving as a central control station performing processing for transmission control is capable of performing wireless communication directly with all other transmission apparatuses in a network system. Therefore, there has been a problem that a wireless communication network construction range is limited within the range capable of directly making communication with the central control station; and the thus constructed network is available in a limited range, which depends on a transmission output of an electric wave of the central control station.

In addition, during transmission control processing using star-type connection, with respect to transmission control or network management also, in the case where direct communication with the central control station is disabled, it has been necessary to disconnect the corresponding transmission apparatus from the network. Therefore, there has been a problem that, in the case where a mobile station freely movable in the network is admitted as a transmission apparatus, control by the central control station becomes very complicated. That is, for the central control station to grasp a position of the mobile station, it has been necessary to transmit and receive a signal for connection check at a short period of time, and frequently supervise a connection state between the central control station and the mobile station.

To solve these problems, for example, it is considered to construct a distributed network configuration in which communication is made only between stations capable of performing direct communication instead of predetermination of the central control station. In the case of this distributed network, if a distance to a necessary destination station is distant, it is required to transmit data by relaying a number of stations. Every time such relaying is performed, it is required to perform processing for transmission start with the destination station for communication. As a result, there is a problem that data transmission is delayed every time the number of steps performing relaying is increased.

SUMMARY OF THE INVENTION

It is an object of the present invention to well control a station incapable of directly making communication with a control station in the case where an attempt is made to control communication in a network system by means of the control station.

As a first aspect of the present invention, there is provided a communication control method comprising:
 specifying a frame period by means of a predetermined signal;
 setting a management data transmission region in the frame period; and
 when a common information to be transmitted from a control station is received by a plurality of communication stations, any of the communication stations repeatedly transmitting the received common information.

According to this communication control method, common information is repeatedly transmitted in a communication station other than the control station, thereby making it possible to receive the common information even in a communication station incapable of directly making communication with the control station.

As a second aspect of the present invention, there is provided a communication control method for controlling an access of wireless communication among a plurality of communication stations by means of a control station, said control method comprising:
 specifying a frame period by a predetermined signal;
 setting a management data transmission region in the frame period;
 allocating a plurality of slots in the management data transmission region, the plurality of communication stations or a control station individually transmitting data concerning communication states in the respective stations; and
 said control station recognizing the presence of a station incapable of directly making wireless communication based on a transmission state of data concerning the communication state.

According to this communication control method, the control station recognizes the presence of a station incapable of directly making wireless communication, and the control station can take action to execute communication control processing for the station.

As a third aspect of the present invention, there is provided a transmission apparatus comprising:
 a timing setting means for setting a frame period based on a predetermined signal and setting a management transmission region in the frame period;

a receiving means for receiving management data to be transmitted from other transmission apparatuses in the management data transmission region; and a transmitting means for transmitting common information in management data which said receiving means has received at a predetermined timing.

According to this transmission apparatus, the common information in the management data received by the receiving means can be transmitted from transmitting means to other transmission apparatuses.

As a fourth aspect of the present invention, there is provided a transmission apparatus comprising:

a timing setting means for setting a frame period based on a predetermined signal and setting a management data transmission region composed of a plurality of slots in the frame period;

a transmitting means for transmitting data on a state of communication with other transmission apparatuses in a predetermined slot in the management data transmission region;

a receiving means for receiving data in a slot other than said predetermined slots in said management data transmission region; and a control means for recognizing the presence of a transmission apparatus incapable of directly making communication with said control apparatus from data on communication state which said receiving mean has received.

According to this transmission apparatus, the presence of a transmission apparatus incapable of directly making communication with the control apparatus is recognized, making it possible to handle the transmission apparatus.

BRIEF DESCRIPTION OF THE DRAWINGS

FIG. 5 is a timing chart showing an example of processing at station synchronous transmission and receiving interval according to one embodiment of the present invention;

FIG. 6 is an illustrative view showing a state of transmission among stations based on processing at the station synchronous transmission and receiving interval shown in FIG. 5;

FIG. 11 is a timing chart showing an example of processing at the management information broadcasting interval according to another embodiment of the present invention;

FIG. 12 is an illustrative view showing a state of transmission among stations based on processing at the management information broadcasting interval shown in FIG. 11;

FIG. 14 is a timing chart showing an example of processing at the management information broadcasting interval according to another embodiment of the present invention (an example of unsuccessful reception at the control station notification interval at any station); and FIG. 15 is an illustrative view showing a state of transmission among stations based on processing at the management information broadcasting interval shown in FIG. 14.

DETAILED DESCRIPTION OF THE PREFERRED EMBODIMENT

Hereinafter, an embodiment of the present invention will be described with reference to FIG. 1 to FIG. 10.

Figure 1:
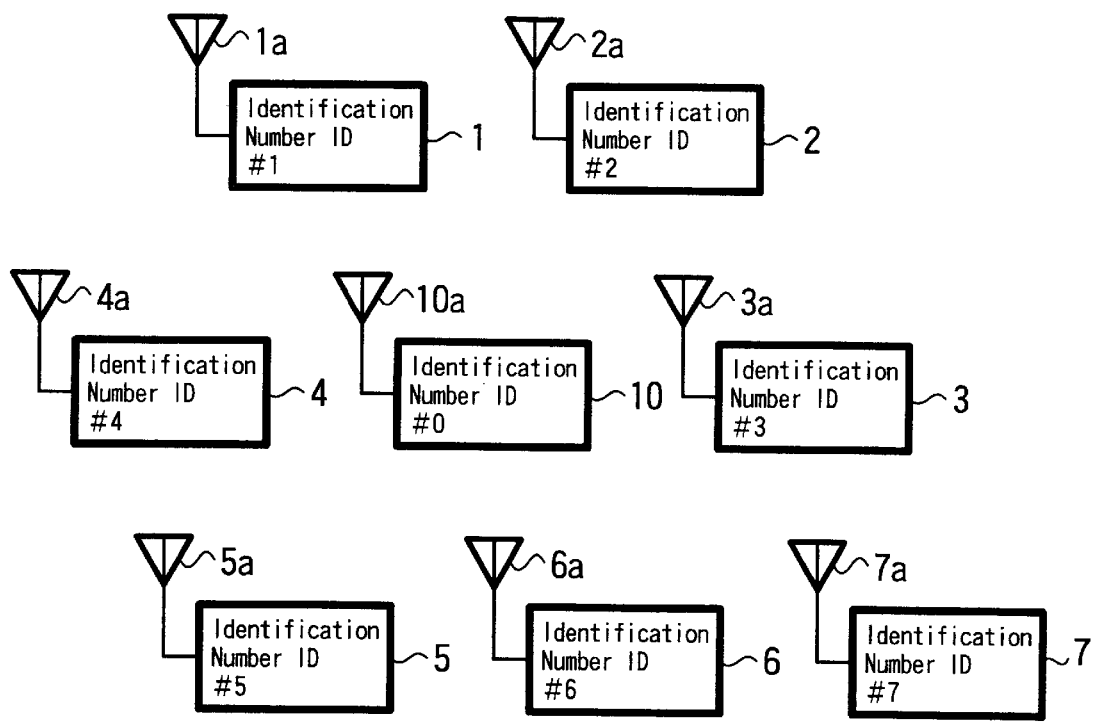
FIG. 1 is a structural view showing an example of a communication system according to one embodiment of the present invention.

In this embodiment, the present invention is applied to a network system constructed as a system for transmitting and receiving video data, voice data, computer-use data or the like at, for example, home or in a relatively small station or the like. Now, a system configuration of this embodiment will be described with reference to FIG. 1. In the network system of this embodiment, the maximum number of wireless transmission apparatuses configuring the network is predetermined. For example, a maximum of 16 wireless transmission apparatuses are available to construct the network. FIG. 1 shows a state in which eight wireless transmission apparatuses 1 to 7 and 10 are allocated. To each of these transmission apparatuses 1 to 7 and 10, antennas 1a to 7a and 10a are respectively connected to perform transmission and receiving. To each of the wireless transmission apparatuses 1 to 7 and 10, various processing apparatus (not shown) such as a video signal reproducing apparatus, a monitor apparatus, a computer machine, a printer apparatus and so on are individually connected. In the case where data transmission is required among these processing apparatus, data is transmitted via a connected wireless transmission apparatus.

The eight wireless transmission apparatuses 1 to 7 and 10 each function as a node that is a communication stations, and each apparatus is assigned an identification number ID individually in advance. That is, the transmission apparatus 10 is assigned #0 as its identification numbers ID, and the transmission apparatuses 1 to 7 are assigned identification numbers ID from #1 to #7 in order.

In this case, a system configuration is such that an arbitrary one wireless transmission apparatus in the network system is set as a route node that functions as a central control station, and wireless communication among nodes is executed by means of polling control from the control station. Basically, it is ideal that this control station uses a wireless transmission apparatus allocated at a position capable of directly making wireless communication with all other communication stations in the system. Here, the wireless transmission apparatus 10 whose identification number ID is #0, allocated at a substantial center in the network system is defined as a central control station. A so-called start-type connection configuration is such that other peripheral communication stations are controlled from this central route node. In the foregoing description, "communication stations", which is merely referred to as, is inclusive of a central control station.

Here in this embodiment, the wireless transmission apparatus 7 whose identification number ID is #7 is arranged at a position incapable of directly making wireless communication with the wireless transmission apparatus 10 that is a central control station thereof. The wireless transmission apparatus 7 is arranged at a position capable of directly making communication between the wireless transmission apparatuses 3 and 6 whose identification numbers IDs are #3 and #6, respectively.

Figure 2:
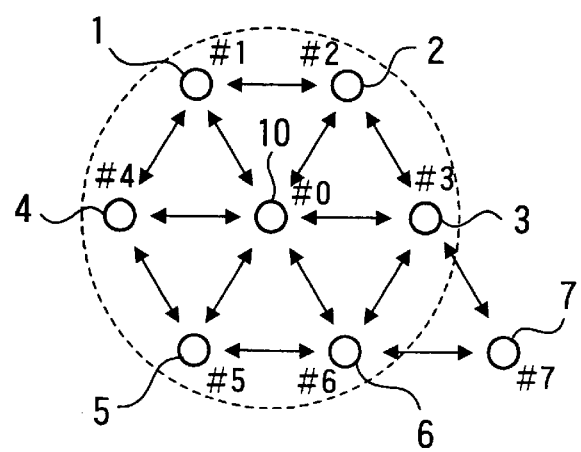
FIG. 2 is an illustrative view showing an example of a physical topology map according to one embodiment of the present invention.

FIG. 2 is a view showing a physical topology map that present a communication state between stations when each communication station and the control station in this embodiment are arranged, wherein direct communication is enabled between connected communication stations indicated by the arrow. In the figure, communication stations 1 to 7 and 10 each capable of directly making communication with adjacently positioned communication stations. For example, the communication station 1 whose identification number ID is #1 is capable of directly making communication with the communication stations 2, 4, and 10 whose identification number IDs are #2, #4, and #0, which are arranged at the periphery of communication station 1. This applies to the other communication stations; and a communication station (a control station) arranged at a substantial center is capable of directly making communication with all of communication stations 1 to 6 other than communication station 7 whose identification number ID is #7. In the case where communication is performed between communication stations incapable of directly making communication, transmission processing is performed by other communication stations by relaying transmission data.

Figure 3:
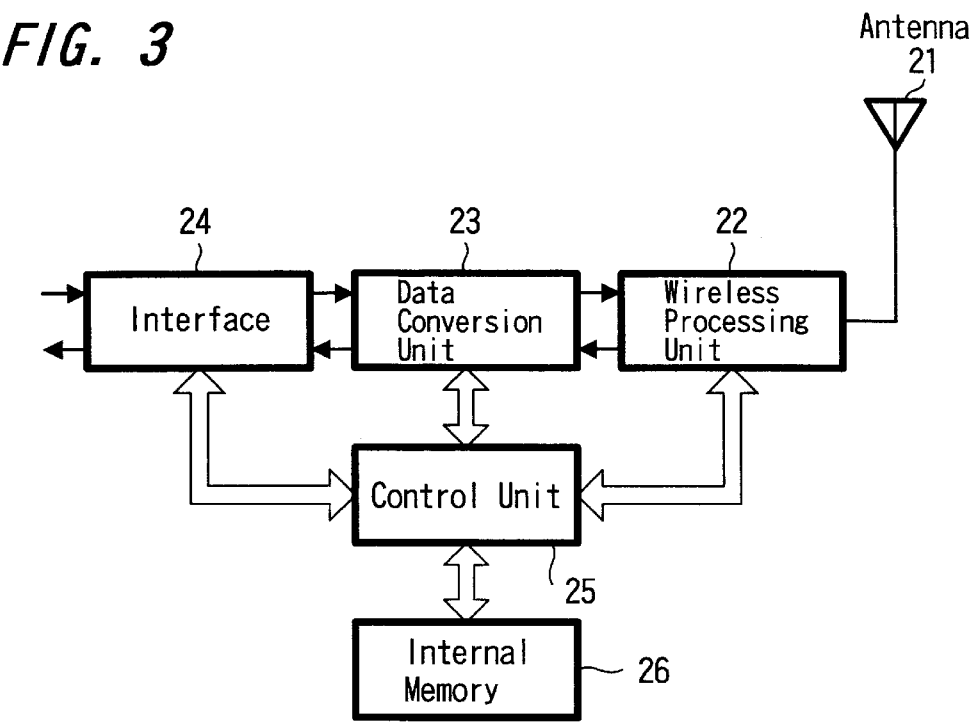
FIG. 3 is a block diagram showing an example of a configuration of a transmission apparatus according to one embodiment of the present invention.

In FIG. 3, there is shown a configuration example of the wireless transmission apparatuses 1 to 7 and 10 each configuring communication stations. In the figure, basically, the wireless transmission apparatuses 1 to 7 and 10 each are commonly configured (except that only an control configuration adopted to function as a central control station differs from other communication stations). These apparatus each are provided with an antenna 21 and a wireless processing unit 22 connected to the antenna 21, the wireless processing unit performing wireless transmission processing and wireless receiving processing, and is configured to enable wireless transmission with other transmission apparatuses. In this case, as a transmission system in which transmission and receiving are performed at the wireless processing unit 22 of this embodiment, for example, a transmission system using a multi-carrier signal called an OFDM (Orthogonal Frequency Division Multiples) is applied. As a frequency used for transmission and receiving, for example, a very high frequency band (for example 5 GHz band) is used. In addition, in the case of this embodiment, a relatively weak transmission output is set. For example, for use in indoor, there is provided an output capable of wireless transmission in a relatively short distance from several meters to several tens of meters.

There is provided a data conversion unit 23 for performing data conversion of a signal received at the wireless processing unit 22 and data conversion of a signal to be transmitted at the wireless processing unit 22. The converted data at the data conversion unit 23 is supplied to a connected processor via an interface unit 24, and data to be supplied from the connected processing unit is supplied to the data conversion unit 23 via the interface unit 24, thereby enabling conversion processing.

Each unit in the wireless transmission apparatus is configured to execute processing based on control of a control unit 25 configured by micro-computers or the like. In this case, when the wireless processing unit 22 receives a control signal, the received control signal is supplied to the control unit 25 via the data conversion unit 23, and the control unit 25 sets each unit in a state indicated by the received control signal. In addition, a control signal to be transmitted from the control unit 25 to other transmission apparatus is supplied from the control unit 25 to the wireless processing unit 22 via the data conversion unit 23, thereby causing its wireless transmission. When an asynchronous signal is received, the control unit 25 is constructed to judge a receiving timing of that synchronous signal, set a frame period based on the synchronous signal, and execute communication control processing at that frame period. In addition, an internal memory 26 is connected to the control unit 25 so that data required for communication control is temporarily stored in the internal memory 26.

Figure 4:
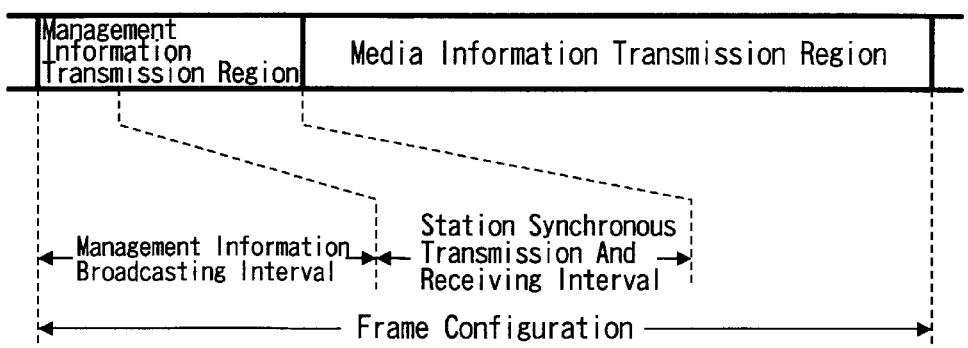
FIG. 4 is an illustrative view showing a frame configuration example according to one embodiment of the present invention.

FIG. 4 shows a configuration of a signal to be transmitted among communication stations (wireless transmission apparatuses 1 to 7 and 10) in the network system of this embodiment. In this embodiment, the network system is configured such that a frame period is specified, and data is transmitted. That is, as shown in FIG. 4, a predetermined single-frame interval is specified, a predetermined interval at the head portion of the single-frame interval is defined as a management information transmission region, and a management information broadcasting interval and a local synchronous transmission and receiving interval are set in the management information transmission region. In addition, an interval other than the management information transmission region of each frame is defined as a media information transmission region. In this media information transmission region, various data is transmitted by means of polling control or the like.

In the management information broadcasting interval, management information common to the system is transmitted from the central control station 10. The management information to be transmitted includes, for example, synchronous data required to obtain frame synchronism in the network system; identification number data specific to the network system; and data of topology map in the network or the like.

In the station or local synchronous transmission and receiving interval in one frame, a predetermined number of slots (16 in this case) are set at an equal interval, and 16 slots in such one frame are allocated respectively to 16 communication stations in this network system. These allocated slots include, for example, a slot for communication station whose identification number ID is #0; a slot for communication station whose identification number ID is #1; a slot for communication station whose identification number ID is #2; ... a slot for communication station whose identification number ID is #15 in an ascending order. The allocated slots for communication stations each are constructed to transmit a local synchronous signal from communication station corresponding to the slot. Here, since the network system is composed of eight communication stations, eight slots (eight slots from the head) are used, and the remaining slots are not used (i.e., data is not transmitted to the remaining slots). The data of identification number ID assigned to each communication station is supplied to the local synchronous signal. The signal includes data concerning the communication station capable of being received at that station (data produced based on the receiving state of the local synchronous signal before one frame) or the like.

Local synchronous signals to be transmitted in each slot at the local synchronous transmission and receiving interval are received and processed at each communication station in the network system. The transmission processing and receiving processing of the local synchronous signal will be described later.

In the media information transmission region, data transfer (transmission) processing is performed among communication stations based on an access control of the central control station. The access control by this central control station is executed by means of polling control from the central control station, for example. In this polling control processing, the communication stations each are called in order from the central control station by means of a polling response request signal, and transmission is sequentially executed for each communication station.

In the communication station of identification number ID specified by the polling response request signal, when data to be transmitted is present, data transmission processing is performed immediately after the polling response request signal has been received. As the transmission processing at this time, it is considered that data transfers in asynchronous (non-synchronizing) transfer mode and isochronous (synchronizing) transfer mode are used depending on type of data to be transmitted. With respect to the asynchronous and isochronous transfer modes, for example, the asynchronous transfer mode is used for transmission of relatively short data such as control data; and the isochronous transfer mode is used for transmission of data requiring a real-time transfer such as video data, voice data or the like. As such transmission control system using polling control, for example, a system conforming to the IEEE1394 Standard is applicable.

Next, the transmission processing and receiving processing of local synchronous signal will be described with respect to FIG. 5. As described previously, 16 slots are provided in the local synchronous transmission and receiving interval in one frame. Hereinafter, it is assumed that eight slots from a 0th slot 0 to a seventh slot are prepared, and the respective slots are individually allocated for communication stations 10 and 1 to 7 for clarity.

In FIG. 5, A to H each shows a communication state at the local synchronous transmission and receiving interval in eight communication stations each. In FIG. 5, A designates the state in communication station 10 that is the central control station, and B to H each designate the state from communication stations 1 to 7 in order. In FIG. 5, the range marked with diagonal line designates as follows: Transmission processing 'Tx' is performed at the wireless processing unit 22 that is transmitting means of that communication station, and wireless transmission is done from the antenna 21. In the other pulse-shaped leading interval, the transmitted signal from another communication station is properly received and processed at the wireless processing unit 22 that is a receiving means of the communication station. In an interval free of pulse-shaped leading, a signal cannot be properly received (i.e., data cannot be decoded correctly by attempting reception).

In the communication station 10 whose identification number ID is #0 that is a central control station, as shown by A in FIG. 5, transmission processing 'Tx' is performed for a station synchronous signal at an interval of 0th slot, and receiving processing is performed in the other slots (intervals in slot 1 and subsequent). At reception in intervals up to the sixth slot, communication stations 1 to 6 allocated in these slots are placed at a position capable of directly making wireless communication with communication station 10, and thus, data included in the receiving signal can be correctly decoded. In contrast, at an interval of seventh slot, communication station 7 is not placed at a position capable of directly making wireless communication with communication station 10, and data cannot be received at this slot position. That is, when a transmission state of the station synchronous signals to be transmitted from the station 10 to the 0th slot is shown by A in FIG. 6, communication stations 1 to 6 whose identification numbers IDs are #1 to #6 are positioned within the range in which the signal transmitted from communication station 10 arrives, and the station synchronous signals from communication station 10 are correctly received at communication stations 1 to 6. However, communication station 7 whose identification number ID is #7 that is at a distant position cannot receive the local synchronous signal from communication station 10.

In communication stations 1 to 7 whose identification numbers IDs are #1 to #7, as shown by B to H in FIG. 5, the station synchronous signal is transmitted at the slot position allocated for each communication station, and receiving processing is performed at the other slot position. That is, in communication station 1 whose identification number ID is #1, as shown by B in FIG. 5, transmission processing 'Tx' is performed for a node synchronous signal in the first slot, and receiving processing is performed in the other slots. At this time, the communication stations whose positions are adjacent to communication station 1 whose identification number ID is #1 are communication stations 10, 2, and 4 whose identification numbers IDs are #0, #2, and #4. In communication station 1, as shown by B in FIG. 5, only the node synchronous signals to be transmitted to the 0th slot, the second slot, and the fourth slot can be correctly received and processed. In addition, when a transmission state of the station synchronous signals to be transmitted from communication station 1 to the first slot is shown by B in FIG. 6, communication stations 10, 2, and 4 whose identification numbers IDs are #0, #2, and #4 are positioned within the range of the signal transmitted from communication station 1 at which the signal to be transmitted from communication station 1 arrives, and the station synchronous signals from communication station 1 are correctly received at communication stations 2, 4, and 10.

In communication station 2 whose identification number ID is #2, as shown by C in FIG. 5, transmission processing 'Tx' is performed for the station synchronous signal in the second slot, and receiving processing is performed in the other slots. At this time, the communication stations at positions adjacent to the communication station 2 are communication stations 10, 1, and 3 whose identification numbers IDs are #0, #1, and #3. In communication station 2, as shown by C in FIG. 5, only the station synchronous signals to be transmitted from these communication stations to the 0th slot, the first slot and the third slot can be correctly received and processed. In addition, when a transmission state of the station synchronous signals to be transmitted from communication station 2 to the second slot is shown by C in FIG. 6, communication stations 10, 1, and 3 whose identification numbers IDs are #0, #1, and #3 are positioned within the range at which the signal to be transmitted from communication station 2 arrives, and the station synchronous signals from communication station 2 are correctly received at communication stations 10, 1, and 3 whose identification numbers IDs are #0, #1, and #3.

In communication station 3 whose identification number ID is #3, as shown by D in FIG. 5, transmission processing 'Tx' is performed for the station synchronous signal in the third slot, and receiving processing is performed in the other slots. At this time, the communication stations whose positions are adjacent to communication station 3 are communication stations 10, 2, 6, and 7 whose identification numbers IDs are #0, #2, #6 and #7. In communication station 3, as shown by D in FIG. 5, only the station synchronous signals to be transmitted from these communication stations to the 0th slot, the second slot, the sixth slot and the seventh slot can be correctly received and processed. In addition, when a transmission state of the station synchronous signals to be transmitted from communication station 3 to the third slot is shown by D in FIG. 6, communication stations 10, 2, 6, and 7 whose identification numbers IDs are #0, #2, #6, and #7 are positioned within the range at which the signal to be transmitted from communication station 3 arrives, and the station synchronous signals from communication station 3 are correctly received at communication stations 10, 2, 6, and 7 whose identification numbers IDs are #0, #2, #6, and #7.

In communication station 4 whose identification number ID is #4, as shown by E in FIG. 5, transmission processing 'Tx' of the station synchronous signal is performed in the fourth slot, and receiving processing is performed in other slots. At this time, the communication stations at their positions adjacent to communication station 4 are communication stations 10, 1, and 5 whose identification numbers IDs are #0, #1, and #5. In communication station 4, as shown by E in FIG. 5, only station synchronous signals to transmitted to the 0th slot, the first slot, and the fifth slot can be correctly received and processed from these communication stations. In addition, when a transmission state of the station synchronous signal to be transmitted from communication station 4 to the fourth slot is shown by E in FIG. 6, communication stations 10, 1, and 5 whose identification numbers IDs are #0, #1, and #5 are positioned within the range at which the signal to be transmitted from communication station 4 arrives. The station synchronous signal from communication station 4 is correctly received at communication stations 10, 1, and 5 whose identification numbers IDs are #0, #1, and #5.

In communication station 5 whose identification number is #5, as shown by F in FIG. 5, transmission processing 'Tx' is performed for the station synchronous signal in the fifth slot, and receiving processing is performed in the other slots. At this time, the communication stations whose positions are adjacent to communication station 5 are communication stations 10, 4, and 6 whose identification numbers IDs are #0, #4, and #6. In communication station 5, as shown by F in FIG. 5, only the station synchronous signals to be transmitted to the 0th slot, the fourth slot and the sixth slot can be correctly received and processed. In addition, when a transmission state of the station synchronous signal to be transmitted from communication station 5 to the fifth slot is shown by F in FIG. 6, communication stations 10, 4, and 6 whose identification numbers IDs are #0, #4, and #6 are positioned within the range at which the signal to be transmitted from communication station 5 arrives, and the station synchronous signals from communication station 5 can be correctly received at communication stations 10, 4, and 6 whose identification numbers IDs are #0, #4, and #6.

In communication station 6 whose identification number ID is #6, as shown by G in FIG. 5, transmission processing 'Tx' is performed for the station synchronous signal in the sixth slot, and receiving processing is performed in the other slots. At this time, the communication stations whose positions are adjacent to communication station 6 are communication stations 10, 3, 5, and 7 whose identification numbers are #0, #3, #5, and #7. In communication station 6, as shown by G in FIG. 5, only the signals to be transmitted from these communication stations to the 0th slot, the third slot, the fifth slot, and the seventh slot can be correctly received and processed. In addition, when a transmission state of the station synchronous signal to be transmitted from communication station 6 to the sixth slot is shown by G in FIG. 6, communication stations 10, 3, 5, and 7 whose identification number IDs are #0, #3, #5, and #7 are positioned within the range at which the signal to be transmitted from communication station 6 arrives, and the station synchronous signals from communication station 5 are correctly received at communication stations 10, 3, 5, and 7 whose identification number ID are #0, #3, #5, and #7.

In communication station 7 whose identification number IF is #7, as shown by H in FIG. 5, transmission processing 'Tx' is performed for the station synchronous signal in the seventh slot, and receiving processing is performed in the other slots. At this time, the communication stations whose positions are adjacent to communication station 7 are communication stations 3 and 6 whose identification numbers IDs are #3 and #6. In communication station 7, as shown by H in FIG. 5, only the station synchronous signals to be transmitted from these stations to the third slot and the sixth slot can be correctly received and processed. In addition, when a transmission state of the station synchronous signal to be transmitted from communication station 7 to the seventh slot is shown by H in FIG. 6, communication stations 3 and 6 whose identification numbers IDs are #3 and #6 are positioned within the range at which the signal to be transmitted from communication station 7 arrives, and the station synchronous signals from communication station 7 are correctly received at communication stations 3 and 6 whose identification numbers IDs are #3 and #6.

Therefore, communication station 10 that is a central control station cannot receive the station synchronous signal from communication station 7 whose identification number ID is #7, and cannot recognize the presence of communication station 7 directly. Based on information contained in the station synchronous signals from communication stations whose identification numbers IDs are #3 and #6, communication station 10 that is a central control station recognizes the presence of communication station 7 from the station information that can be received at the respective stations.

In addition, communication stations 1 to 6 capable of directly receiving the signal from communication station 10 that is a central control station judge the positions of transmission slots allocated for their own stations based on the receiving timing of the synchronous signal from this communication station 10. Communication station 7 incapable of directly receiving the signal from communication station 10 judges the position of transmission slot allocated for its own station based on receiving timing of the station synchronous signal that can be received at that communication station 7. That is, the position of slot 7 allocated for its own station is judged from the positions of the third and sixth slots.

Hereinafter, transmission and receiving processes of the station synchronization information at the station synchronous transmission and receiving interval at each communication station will be described with reference to a flow chart of FIG. 7. Each communication station judges whether or not a slot interval that is a transmission timing of its station arrives (step 101); and, if it is not the transmission timing of its own station, receives station synchronization information of other station (step 102). Based on a receiving state of the received local synchronous signals of other station, each communication station creates the station synchronization information to be transmitted from its own station (step 103). Then, based on the received station synchronization information of the other station, each communication station judges whether its own station is a branch station (step 104). That is, when each communication station can receive the station synchronization information from a communication station incapable of directly receiving the signal from communication station 10 that is a central control station, it judges that its own station is a branch station. In this embodiment, the communication station which cannot directly receive the signal from communication station 10 that is a central control station is the communication station 7, and communication stations 3 and 6 can directly receive the local synchronous information from this communication station 7. Thus, the two communication stations 3 and 6 are recognized to be branch stations.

In step 101, when each communication station judges as being a slot interval that is a transmission timing of its own station, it acquires the station synchronization information of its own station which was created in step 103 (in step 105), and wireless-transmits the acquired station synchronization information of its own station on a network (step 106).

Next, processing to be performed at the management information broadcasting interval of each frame period will be described. In this management information broadcasting interval, a communication station that is judged to be a branch station in the flow chart of FIG. 7 is constructed to perform retransmission processing for the management information. A to H in FIG. 8 each show a communication state at the management information broadcasting interval at eight communication stations. A in FIG. 8 show the state in communication station 10 that is a central control station; and B to H in FIG. 8 show the states of communication stations 1 to 7 in order. In FIG. 8, the range marked with slant lines designates as follows: Transmission processing 'Tx' is performed at the wireless processing unit 22 that is transmitting means of the communication station, and wireless transmission is done from the antenna 21. The other pulse-shaped rise interval designates a state in which receiving processing 'Rx' of the transmitted management information from other communication stations is performed at the wireless processing unit 22 that is receiving means of the communication station. An interval free of a pulse-shaped rise designates a state in which the management information cannot be received.

Figure 8:
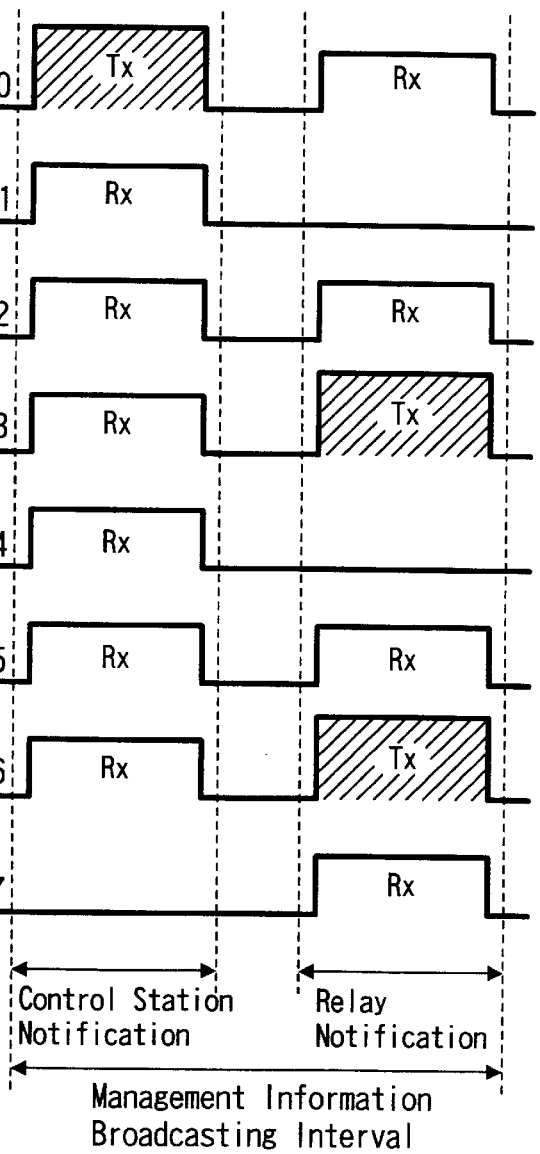
FIG. 8 is a timing chart showing an example of processing at the management information broadcasting interval according to one embodiment of the present invention.
Figure 9:
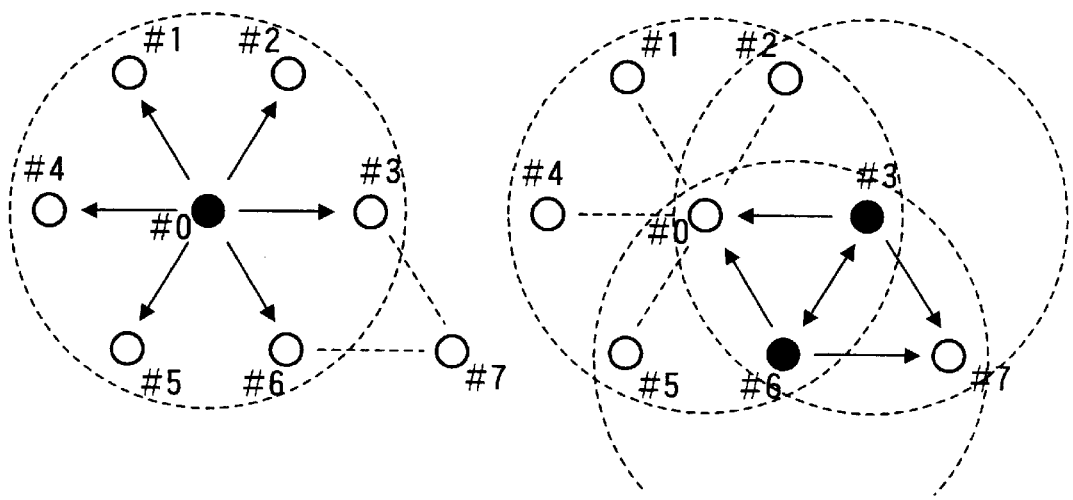
FIG. 9 is an illustrative view showing a state of transmission among stations based on processing at the management information broadcasting interval shown in FIG. 8.

Here, a first half of the management information broadcasting interval is defined as a control station notification interval, and a latter half thereof is defined as a relay notification interval. Communication station 10 whose identification number ID is #0 that is a central control station, as shown by A in FIG. 8, transmits management information common to each station at the control station notification interval. In FIG. 9, A shows a range at which the management information from this communication station 10 arrives. Thus, the transmitted management information, as shown by B to G in FIG. 8, is received at communication stations 1 to 6 capable of directly making communication with communication station 10, and the control unit 25 in each communication station stores the information in the connected internal memory 26. In communication station 7 that is a hidden terminal station incapable of directly making communication with communication station 10, as shown by H in FIG. 8, management information is not received at this control station notification interval.

Figure 7:
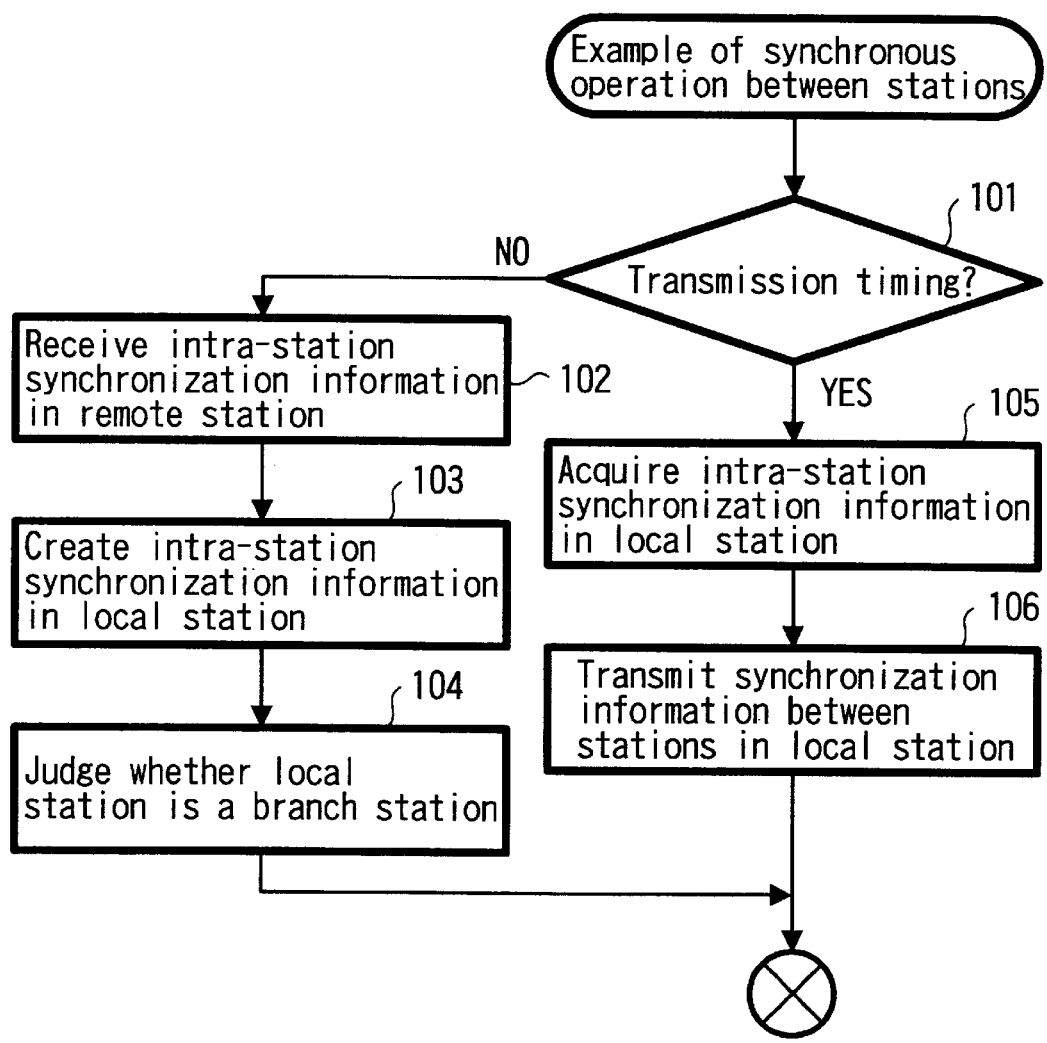
FIG. 7 is a flow chart showing an example of processing operations at the station synchronous transmission and receiving interval according to one embodiment of the present invention.

In the latter-half relay notification interval, the above mentioned communication station judged to be a branch station during processing in the flow chart in FIG. 7 performs processing for transmitting the received and stored information at the immediately preceding control station notification interval. That is, as shown by D and G in FIG. 8, communication stations 3 and 6 judged to be branch stations for communication station 7 transmits management information. In FIG. 9, B shows a transmission state of the management information from these communication stations 3 and 6. The management information to be transmitted from the communication stations 3 and 6 is received at communication station 7 that is a hidden terminal station, as shown by H in FIG. 8. In addition, at the other communication stations 2, 5, and 10 adjacent to communication stations 3 and 6 also, the retransmitted management information is received.

Figure 10:
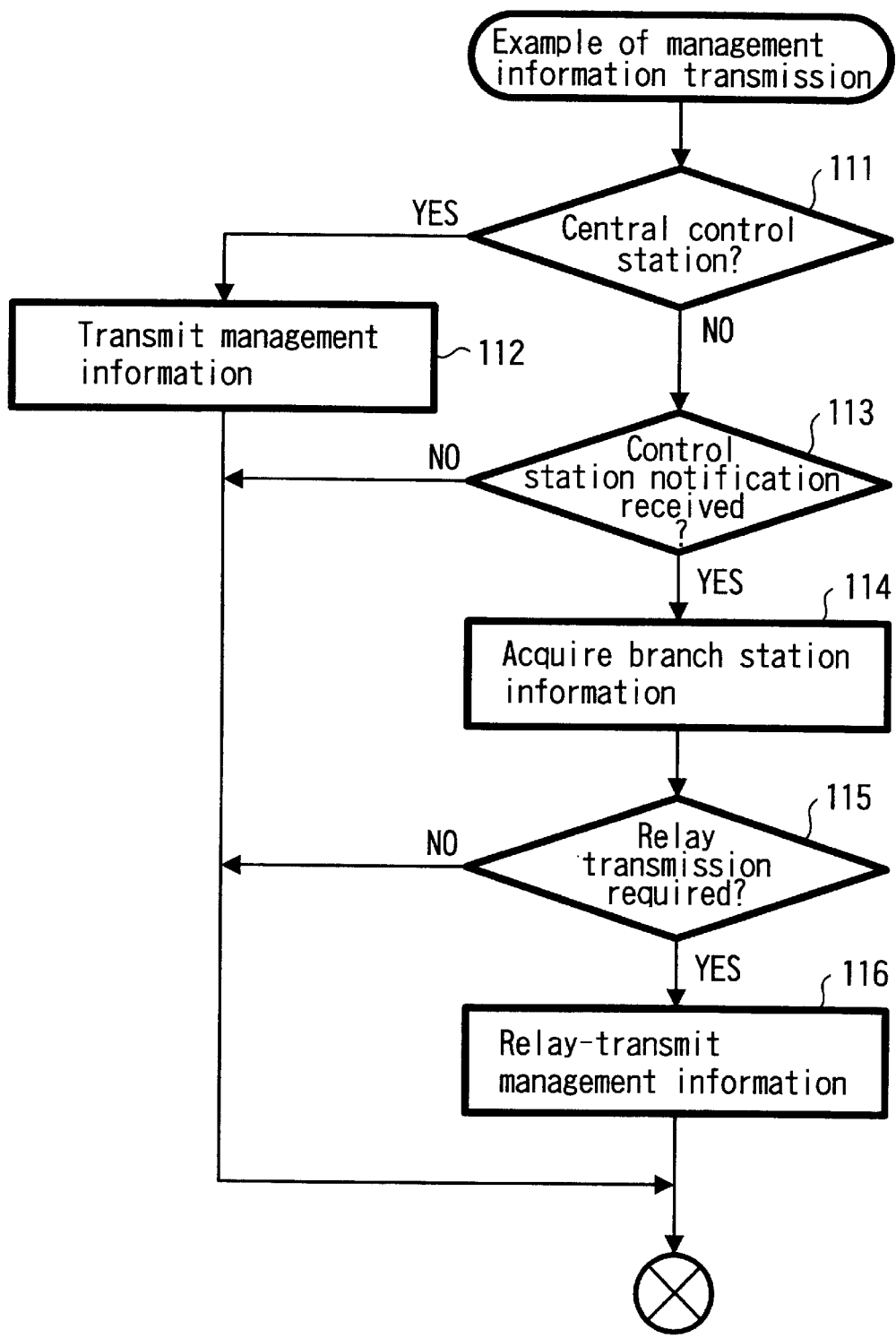
FIG. 10 is a flow chart showing an example of processing operations at the management information broadcasting interval according to one embodiment of the present invention.

Now, transmission and receiving processes of the management information at each communication station will be described with reference to a flow chart in FIG. 10. Each communication station judges whether or not its own station is a central control station (step 111). When its own station is a central control station, each communication station transmits management information in the control station notification interval (step 112). When its own station is judged not to be a central control station, each communication station judges whether or not management information can be received at the control station notification interval (step 113). When the management information cannot be received, each communication station receives and processes the management information in the relay notification interval.

When the management information can be received in step 113, each communication station acquires branch station information defined at the control unit 25 of its own station. The branch station information is information defined based on the judgment in step 104 in the flow chart of FIG. 7. Here, each communication station judges whether or not its own station is a branch station, that is, whether or not the station requires relay transmission of management information (step 115). In the case where the station does not require relay transmission of management information, processing concerning the management information in this frame is terminated. In the case where the station requires relay transmission of management information, the management information is subject to transmission processing in the relay notification interval (step 116).

For the relay transmission of management information in step 116, as shown in FIG. 8, the management information is transmitted simultaneously at a same frequency from a plurality of communication stations 3 and 6 to communication station 7 whose identification number ID is #7. However, a transmission timing or the like is precisely matched, thereby making it possible for communication station 7 to properly receive and process signals to be transmitted simultaneously from a plurality of stations. To such simultaneous transmission from a plurality of stations, there can be applied a technology already developed as simultaneous transmission technology from a plurality of stations called SFN (Single Frequency Network) or the like in a digital broadcasting system, for example, in the case of the OFDM system applied as transmission processing and receiving processing at the communication stations in this embodiment.

Communication station 7 which receives signals to be transmitted simultaneously from a plurality of stations may be configured by applying diversity receiving technology using a plurality of receiving antennas so as to receive a signal from a specified branch station with precedence.

Thus, each communication station configuring a wireless communication network is configured to perform the processing described in this embodiment, thereby making it possible for a central control station to recognize a communication station (a hidden terminal station) incapable of directly making wireless communication with the central control station, and to control such hidden terminal station as a communication station in the network. That is, a central control station can recognize a hidden terminal station by transmitting and receiving the local synchronous signal at each communication station, and can perform broadcasting processing of common management information from the central control station to that hidden terminal station by relay processing of management information at a branch station.

In the above mentioned embodiment, although only a station recognized as a branch station in the network performs relay transmission of management information, all communication stations receiving management information at the control station notification interval may cause relay transmission of management information at the relay notification interval. That is, as shown by A in FIG. 11, when the management information common to each station is transmitted from the communication station 10 with the identification number #0 as a central control station at the control station notification interval in the management information broadcasting interval, and communication stations 1 to 6 whose identification numbers IDs are #1 to #6 shown by B to G in FIG. 11 receive the management information, all of the communication stations 1 to 6 receiving the information may be configured to perform transmission processing 'Tx' for the received management information at the relay notification interval. With such configuration, communication station 7 that is a hidden terminal station incapable of making direct communication with the central control station can receive management information at the relay notification interval so shown by H in FIG. 11.

In the case of an example of FIG. 11, at the control station notification interval, management information is transmitted from communication station 10 whose identification number ID is #0, as shown by A in FIG. 12. At the relay notification interval, as shown by B in FIG. 12, all stations capable of receiving the signals from communication station 10 serve as branch stations, and management information is relay-transmitted.

Figure 13:
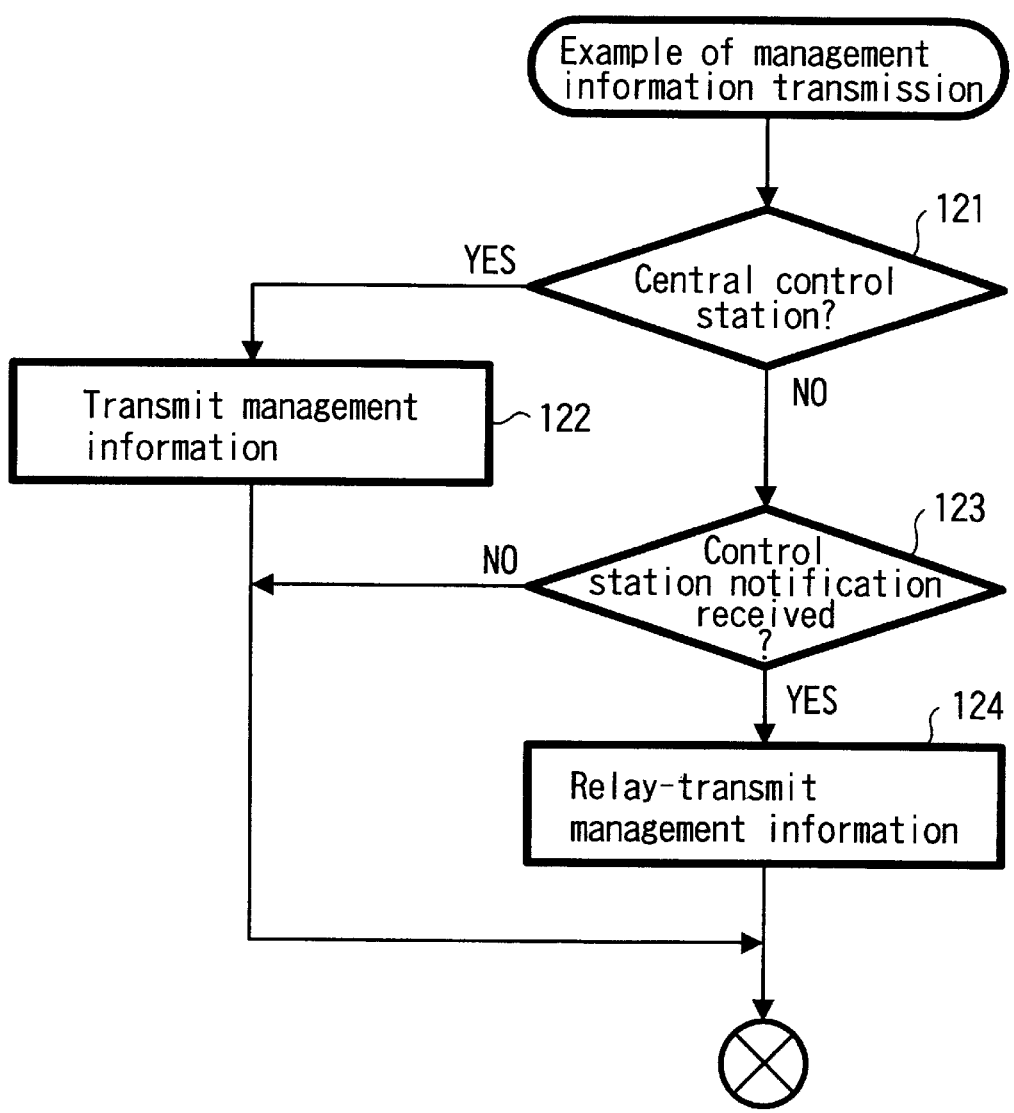
FIG. 13 is a flow chart showing an example of processing operations at the management information broadcasting interval according to another embodiment of the present invention.

Processing of each communication station at the management information broadcast interval in which the processing shown in FIG. 11 and FIG. 12 each is performed is shown in a flow chart of FIG. 13. Each communication station judges whether or not its own station is a central control station (step 121). When its own station is the central control station, it transmits management information at the control station notification interval (step 122). When its own station is judged not to be a central control station in step 121, each communication station judges whether or not management information can be received in the control station notification interval (step 123). When management information cannot be received, the management information is subject to receiving processing at the relay notification interval. When management information can be received in step 123, the management information is subject to transmission processing at the relay notification interval (step 124).

With such configuration to perform processing, information common to the network can be notified within the range at which the transmission signal from all communication stations other than a central control station arrives, and the networking range can be substantially broadened. Therefore, this configuration is applicable to a case in which a hidden terminal station moves in the vicinity of the network, for example. In addition, when any of the communications 1 to 6 fails to temporarily receive management information for any reason, the management information to be transmitted at the relay notification interval is received, thereby making it to recover such failure.

FIG. 14 and FIG. 15 each show an example of the state in the above case. For example, as shown by A in FIG. 14. When management information common to each station is transmitted from communication station 10 whose identification number ID is #0 that is a central control station at the control station notification interval in the management information broadcasting interval, communication stations 2, 4, and 6 can correctly receive the management information at this time, as shown by B to G in FIG. 14, and communication stations 1, 3, and 5 fail to receive the management information (NG). At this time, communication stations 2, 4, and 6 correctly receiving management information performs transmission processing 'Tx' for the received management information at the relay notification interval; communication station 7 that is a hidden terminal station as shown by H in FIG. 14 receives management information; and communication stations 1, 3, and 5 receives management information at-the relay notification interval.

In the case of this example of FIG. 14, at the control station notification interval, management information is transmitted from communication station 10 whose identification number ID is #0 as shown by A in FIG. 15, and is normally received at communication stations 2, 4, and 6. In the relay notification interval, as shown by B in FIG. 15, management information is relay-transmitted from these communication stations 2, 4, and 6 that have successfully received the information to the other communication stations.

Thus, management information not only can be relay-transmitted to the hidden terminal station, but can be transmitted reliably to each station in the network, and wireless network configuration can be made more reliable.

In the above mentioned embodiment, although an interval for transmitting management information from a central control station and a relay notification interval for relaying the management information are provided in the management information broadcasting interval provided in the management information transmission region in each frame period so that the management information is relay-transmitted from a branch station in the management information transmission region, relay transmission of management information from the branch station may be configured to be performed within another period.

For example, when only the management information broadcasting interval is provided in the management information transmission region within each frame period, and in a communication station judged to be a branch station, a central control station performs polling control for its own station in a media information transmission region (refer to FIG. 4), the received management information at the management information broadcasting interval may be transmitted to a hidden terminal station.

In addition, there is shown a preferred embodiment of the frame configuration described in the above mentioned embodiment. Various frame configurations suitable to a transmission protocol applied to a network system is applicable without being limited thereto. For example, in an example shown in FIG. 4, although the management information transmission region composed of the management information broadcasting interval and the station synchronous transmission and receiving interval are allocated at the head of each frame, this region may be allocated at the other position in one frame.

In the above mentioned embodiment, although the management information transmission regions are provided in all frames, only one management information transmission region may be provided at every predetermined number of frames, thereby transmitting management information and local synchronization information.

Further, in the above mentioned embodiment, although a frame period is specified based on management information to be transmitted from a central control station or a branch station in the management information transmission region, the frame period may be specified by means of other signals.

According to the present invention, the presence of a so-called hidden terminal station incapable of directly receiving information from a central control station can be recognized in a network, there is no need for limiting the network utility range to a range capable of receiving the signal from the central control station, and the network can be broadened to a wider range.

In addition, station synchronization intervals allocated for each station are provided to grasp the present of a station configuring a network, and a hidden terminal station incapable of directly receiving the signal from a central control station permits information transmission, thereby making it possible to broaden a network configuration.

In a hidden terminal station incapable of directly receiving information from a central control station, a branch station capable of making direct communication is relayed, thereby making it possible to broadcast-transmit network-shared information to be sent from the central control station.

For example, in the case where a hidden terminal station incapable of directly receiving information from a control station transmits or receives transmission control information to a central control station, a branch station (capable of communicating with a control station) existing in the middle is specified as a relay station, thereby making it possible to transit information.

In this manner, even if s signal from a central control station cannot be received, the presence of that station is recognized. For example, even if there exists a station moving in a network freely, transmission control is facilitated. Namely, even if an information transmitting station has moved to the outside of an electric wave arrival zone of the central control station, there is no need for interrupting the transmission, and thus, stable network operation is enabled.

Further, even if a signal from a central control station cannot be received temporarily by virtue of movement of human being existing in a wireless network, there is no need for cutting it from the network immediately, and this wireless transmission processing and its control suitable to information transmission at home or the like is enabled.

A mobile range can be broadened to a wider range by applying to a control of a network containing a mobile station. Thus, even if the mobile station has moved to an area incapable of directly receiving a signal from a central control station, network connection can be ensured through a branch station, thus making it possible to facilitate control.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication control method for controlling an access of wireless communication among a plurality of communication stations based on common information to be transmitted from a control station, comprising the steps of:

specifying a frame period by means of a predetermined signal;

setting a management data transmission region in the frame period; and setting an information data transmission region in the frame period, wherein information data is transmitted by polling control from the control station, and when said common information to be transmitted from said control station in said management data transmission region is received by said plurality of communication stations, the received common information is retransmitted by any of the communication stations in said management data transmission region, wherein a communication station retransmitting said common information is a branch station which judges that a hidden station incapable of directly making communication with said control station exists among said plurality of communication stations by performing communication with its own station, whereby said control station communicates through said branch station with said hidden station in said information data transmission region.

2. A communication control method as claimed in claim 1, wherein said communication station repeatedly transmitting said common information is all stations which received said common information.

3. A communication control method as claimed in claim 1, wherein said information data transmission region is an asynchronous data transmission region.

4. A communication control method for controlling an access of wireless communication among a plurality of communication stations by means of a control station, comprising the steps of:

specifying a frame period by a predetermined signal;

setting a management data transmission region in the frame period;

setting an information data transmission region in the frame period;

allocating a plurality of slots in said management data transmission region, said plurality of communication stations or said control station individually transmitting data concerning communication states in the respective stations, and said control station recognizing the presence of a hidden station incapable of directly making wireless communication based on a transmission state of data concerning the communication state, wherein when data concerning a hidden station incapable of receiving data from said control station is received as data concerning a communication state which said communication stations transmit, the data is added to data concerning a communication state which its own station transmits.

5. A transmission apparatus in which communication is performed based on control by a predetermined control apparatus, comprising:

timing setting means for setting a frame period based on a predetermined signal, setting a management transmission region in the frame period, and setting an information data transmission region in the frame period;

receiving means for receiving management data to be transmitted from other transmission apparatuses in said management data transmission region; and transmitting means for transmitting common information in management data that said receiving means has received at a predetermined timing and for transmitting information data in the information data transmission region, wherein said transmission means transmits common information when it is judged that at least one of other transmission apparatuses is hidden and is incapable of receiving common information from said control apparatus based on management data that said receiving means has received.

6. A transmission apparatus as claimed in claim 5, wherein a predetermined timing at which said transmitting means transmits common information is a timing other than a management data transmission region set by said timing setting means.

7. A transmission apparatus as claimed in claim 6, wherein said transmission means transmits said common information in an asynchronous data transmission region.

8. A transmission apparatus in which communication is performed based on control by a predetermined control apparatus, comprising:

timing setting means for setting a frame period based on a predetermined signal, setting a management data transmission region composed of a plurality of slots in the frame period, and setting an information data transmission region in the frame period;

transmitting means for transmitting data on a state of communication with other transmission apparatuses in a predetermined slot in said management data transmission region;

receiving means for receiving data in a slot other than said predetermined slot in said management data transmission region; and control means for recognizing a presence of a hidden transmission apparatus incapable of directly making communication with said control apparatus from communication state data that said receiving mean has received.

9. A transmission apparatus as claimed in claim 8, wherein when data concerning a transmission apparatus incapable of receiving data from said control apparatus is received as data concerning a communication state which said receiving means has received, the data is added to data concerning a communication state which said transmitting means transmits.

\* \* \* \* \*